United States Patent
Sip

(10) Patent No.: US 8,405,624 B2
(45) Date of Patent: Mar. 26, 2013

(54) SECURITY PROTECTION SYSTEM AND ELECTRONIC DEVICE WITH SAME

(75) Inventor: Kim-Yeung Sip, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 928 days.

(21) Appl. No.: 12/469,673

(22) Filed: May 20, 2009

(65) Prior Publication Data

US 2010/0182283 A1 Jul. 22, 2010

(30) Foreign Application Priority Data

Jan. 16, 2009 (CN) .......................... 2009 1 0300216

(51) Int. Cl.
*G06F 3/033* (2006.01)
(52) U.S. Cl. ........................................ 345/173; 345/174
(58) Field of Classification Search .................. 345/173, 345/156; 3/173, 156
See application file for complete search history.

(56) References Cited

U.S. PATENT DOCUMENTS

| | | | | |
|---|---|---|---|---|
| 6,915,103 B2* | 7/2005 | Blume | ........................... | 434/317 |
| 7,007,168 B2* | 2/2006 | Kubo et al. | .................... | 713/183 |
| 7,084,734 B2* | 8/2006 | Singh | ............................. | 340/5.2 |
| 7,657,849 B2* | 2/2010 | Chaudhri et al. | ............. | 715/863 |
| 2006/0109252 A1* | 5/2006 | Kolmykov-Zotov et al. | . | 345/173 |

* cited by examiner

*Primary Examiner* — Amare Mengistu
*Assistant Examiner* — Shawna Stepp Jones
(74) *Attorney, Agent, or Firm* — Altis Law Group, Inc.

(57) ABSTRACT

The present disclosure provides a security protection system for an electronic device. The security protection system includes a magnetic stylus, at least one coil, a processor, and a memory. The coil is received in the electronic device and configured for inducing an induced current when the magnetic stylus moves relative to the coil. The processor is electronically connected to the at least one coil and includes a status module, a lock module, and an unlock module. The status module is configured for setting the security protection system in a lock or an unlock state. The lock module is configured for storing parameters of the induced current as a password in the lock state. The unlock module is configured for comparing parameters of the induced current with the password stored, and detecting whether an unlock operating being successful. The present invention also provides an electronic device having a security protection system.

11 Claims, 5 Drawing Sheets

SECURITY PROTECTION SYSTEM AND ELECTRONIC DEVICE WITH SAME

BACKGROUND

1. Technical Field

The present disclosure relates to security protection systems and, particularly to a security protection system for an electronic device and an electronic device using the same.

2. Description of Related Art

Computers and other electronic devices, such as cell phones, may store important information, and a password is used to protect access to the important information. However, the alphanumeric characters used in creating passwords are easily cracked and may even be shoulder surfed.

What is needed, therefore, is a security protection system and an electronic device with the same to overcome or at least alleviate the above-described problem.

BRIEF DESCRIPTION OF THE DRAWINGS

Many aspects of the present security protection system and the electronic device with the same can be better understood with reference to the following drawings. The components in the drawings are not necessarily drawn to scale, the emphasis instead being placed upon clearly illustrating the principles of the present password protection.

DETAILED DESCRIPTION

Embodiments of the present disclosure will now be described in detail below, with reference to the accompanying drawings.

Figure 1:
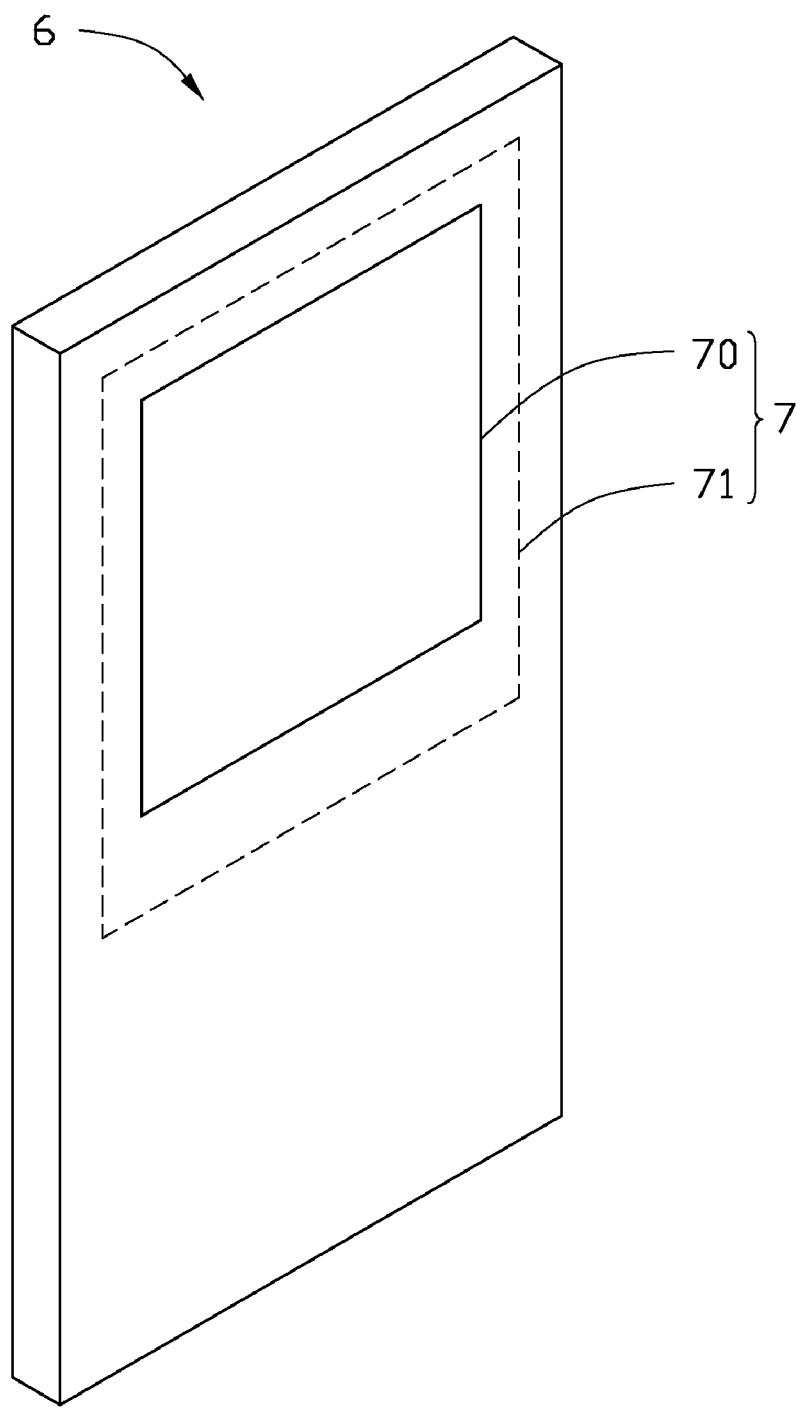
FIG. 1 is a schematic view of an electronic product using a security protection system according to a first exemplary embodiment.
Figure 2:
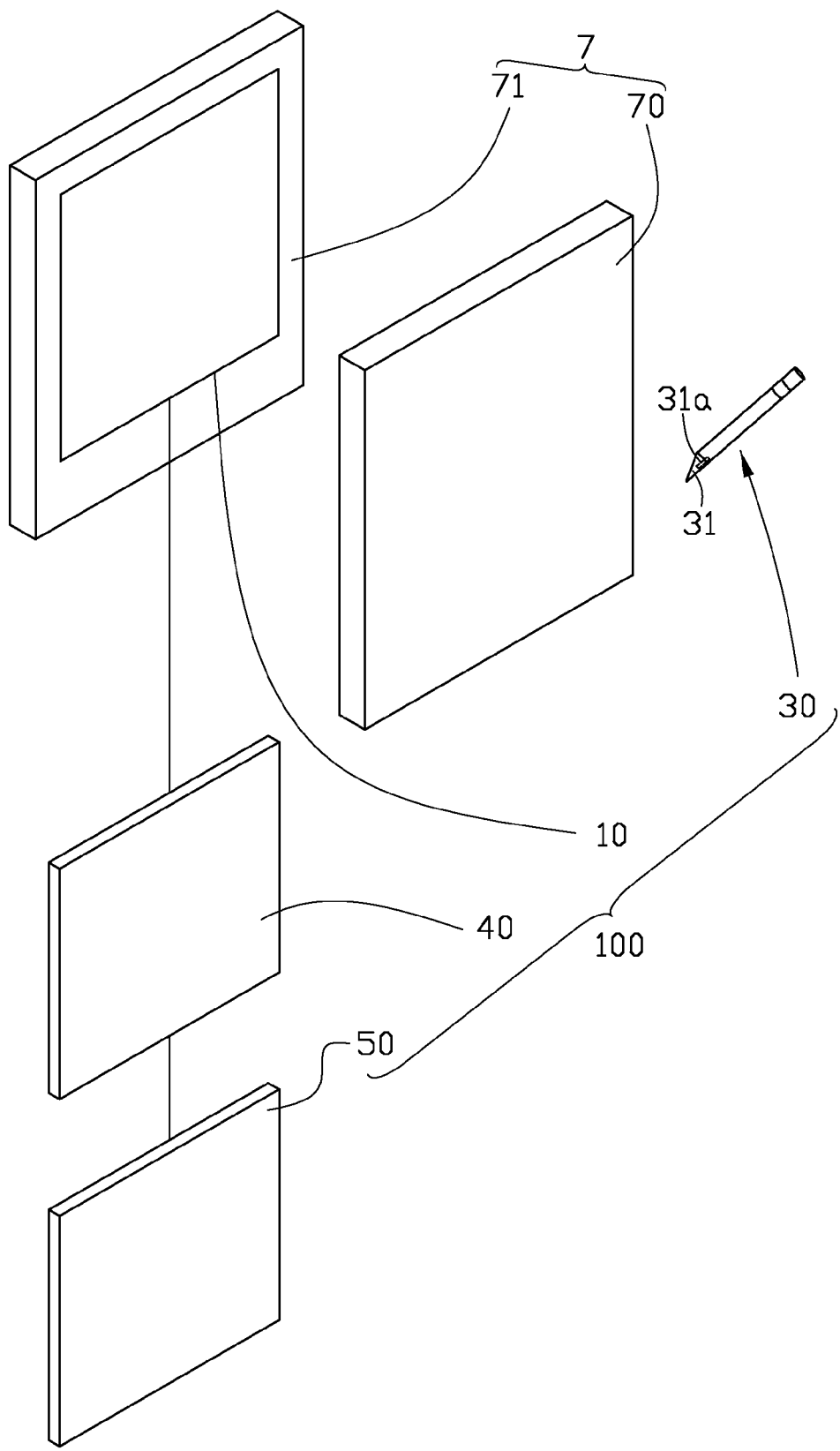
FIG. 2 is a schematic view of the security protection system of FIG. 1.

Referring to FIGS. 1 and 2, a security protection system 100, according to a first exemplary embodiment, is shown. The security protection system 100 can be used in an electronic device 6, such as a computer, a cellphone, a MP3 player, a camera, etc. In the present embodiment, the electronic device 6 is a cell phone. The electronic device 6 includes a display 7. The display 7 includes a circuit board 71 and a panel 70 fixed on the circuit board 71.

The security protection system 100 includes at least one coil 10, a magnetic stylus 30, a processor 40, and a memory 50. The coil 10, the processor 40, and the memory 50 are received in the electronic device 6.

The shape of the coil 10 can be rectangular, circular, triangular, etc. In the present embodiment, the shape of the coil 10 is rectangular. There is only one coil 10 and is fixed on the circuit board 71. The coil 10 is made of conducting material and is printed on the circuit board 71. The coil 10 and the memory 50 are electrically coupled to the processor 40.

The magnetic stylus 30 includes an end 31 and a permanent magnet 31a fixed on the end 31 thereof.

Figure 3:
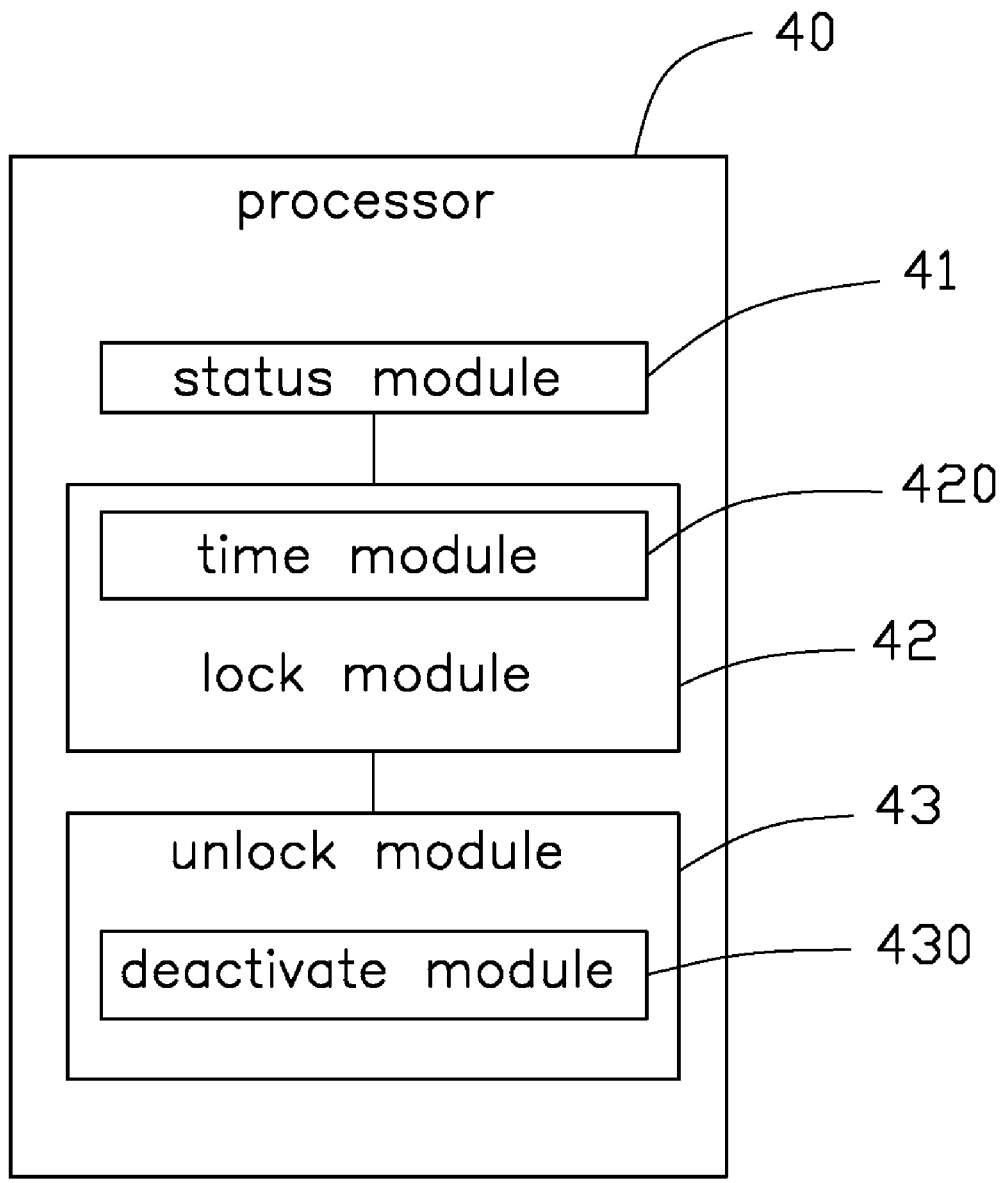
FIG. 3 is a functional block diagram of the security protection system of FIG. 2.

Further referring to FIG. 3, the processor 40 includes a status module 41, a lock module 42, and an unlock module 43. The status module 41 is electrically coupled to the lock module 42 and the unlock module 43. The status module 41 is configured for setting a current state in a lock state or an unlock state in a preset time. The preset time can be factory default or can be set manually. In the present embodiment, the preset time is set by suppliers. Security protection system 100 can set an unlock procedure only when the security protection system 100 is in the lock state.

An induced current is induced by the coil 10 when the magnetic stylus 30 moves above the panel 70 relative to the coil 10. The direction of the induced current is determined by the movement direction of the magnetic stylus 30. When the magnetic stylus 30 moves towards the coil 10, the induced current of the coil 10 flows in a first direction. When the magnetic stylus 30 moves away from the coil 10, the induced current of the coil 10 flows in a second direction opposite to the first direction. When the magnetic stylus 30 stops moving, no current is induced. So, the security protection system 100 uses the change in the direction of the induced current and the time interval between the change as a password. The change of the induced current includes the frequency of the change in the direction of the induced current and the time interval between the change.

The lock module 42 is configured for storing unlock procedure parameters relating to the induced current into the memory 50 when the security protection system 100 is in the lock state. The lock module 42 further includes a time module 420. The time module 420 is configured for tracking the time interval between the different directions induced currents and time interval of occurrence of the induced currents. The time module 420 starts tracking a time when the induced current direction is in the first direction, and stops when the direction of the induced current changes from the first direction to the second direction or the current with the first direction is removed. The lock module 42 sets the time interval as the password. The parameters of the induced current include at least one of the frequency of the change in the direction of the induced current, the time interval between the change and the time interval of occurrence of the induced current.

The lock module 42 can set a password having various parameters. The password can be set having only a frequency of the change in the direction of the induced current, the time interval between the change, the time interval of occurrence of the induced current. In the present embodiment, only the frequency of the direction change of the induced current is set as the password in the lock state.

The unlock module 43 is configured for comparing parameters of the induced current with the unlock parameters in the memory 50, and detecting whether an unlock operating is successful. In the present embodiment, the unlock procedure is performed when the security protection system 100 is in the locked state. In detail, when the security protection system 100 is in the unlock state, the unlock procedure is performed by moving the magnetic stylus 30 relative to the coil 10 on the panel 70. The unlock module 43 compares the properties of the induced current to the unlock parameters stored in the memory 50. If the parameters of the induced current match with the password parameters, the unlock module 43 confirms a successful unlock procedure. If the parameter does not match the stored password, the unlock module 43 prompts to perform the unlock procedure again. In the present embodiment, the unlock module 43 also includes a deactivate module 430, the deactivate module 430 is configured for stopping further unlock operations by the unlock module 43, if the number of wrong password has reached a predetermined count, the deactivate module 430 monitors the count and will deactivate the unlock module 43 at the predetermined count, and the unlock module 43 can only be reactivated by inputting a Personal Identify Number or by the supplier. In the present embodiment, the predetermined count of consecutive incorrect passwords is 3. The security protection system 100 using the movement of the magnetic stylus 30 to unlock is more secure than alphanumeric passwords. So the security protection system 100 has relatively higher security.

Figure 4:
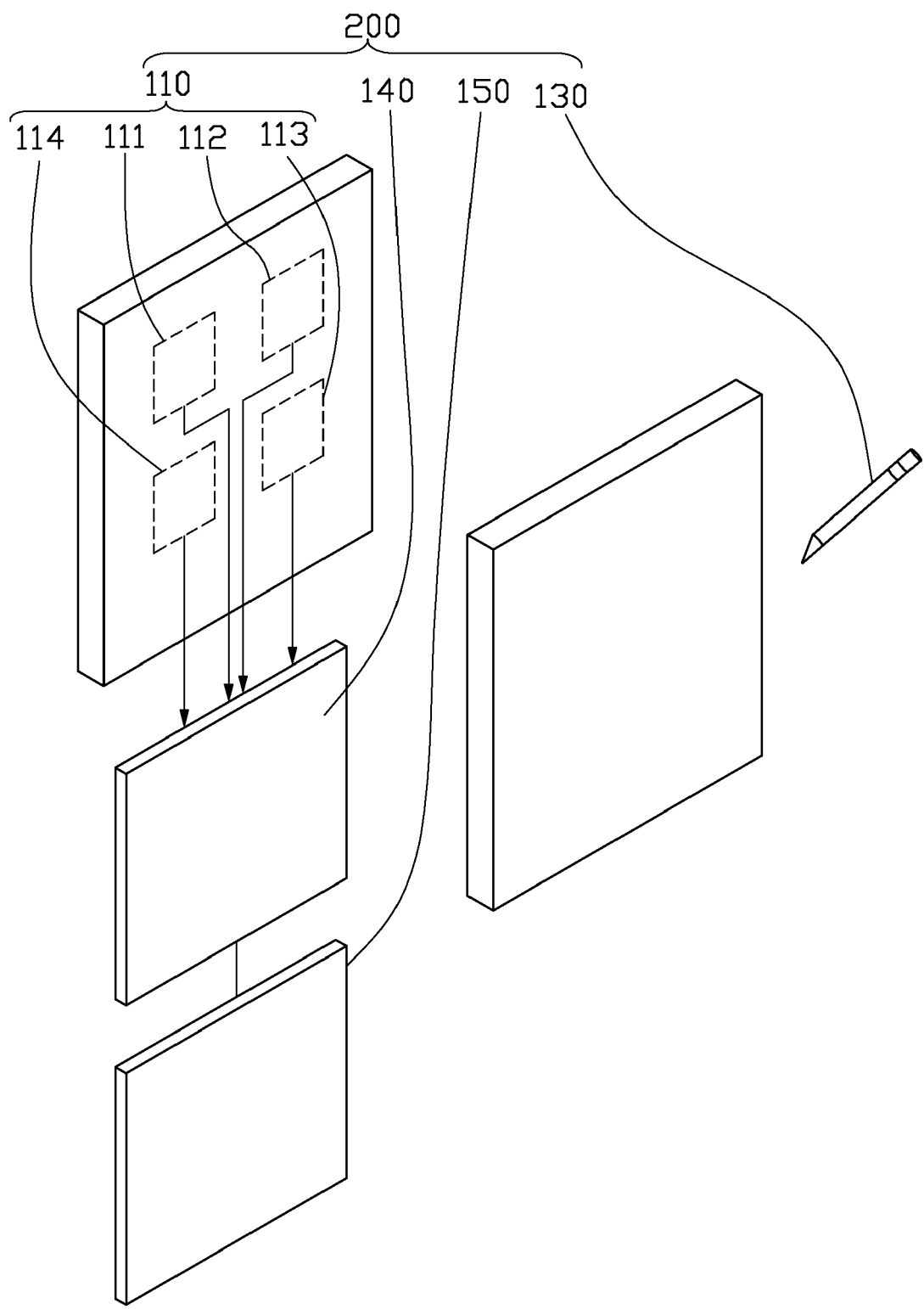
FIG. 4 is a schematic view of a security protection system according to a second exemplary embodiment.
Figure 5:
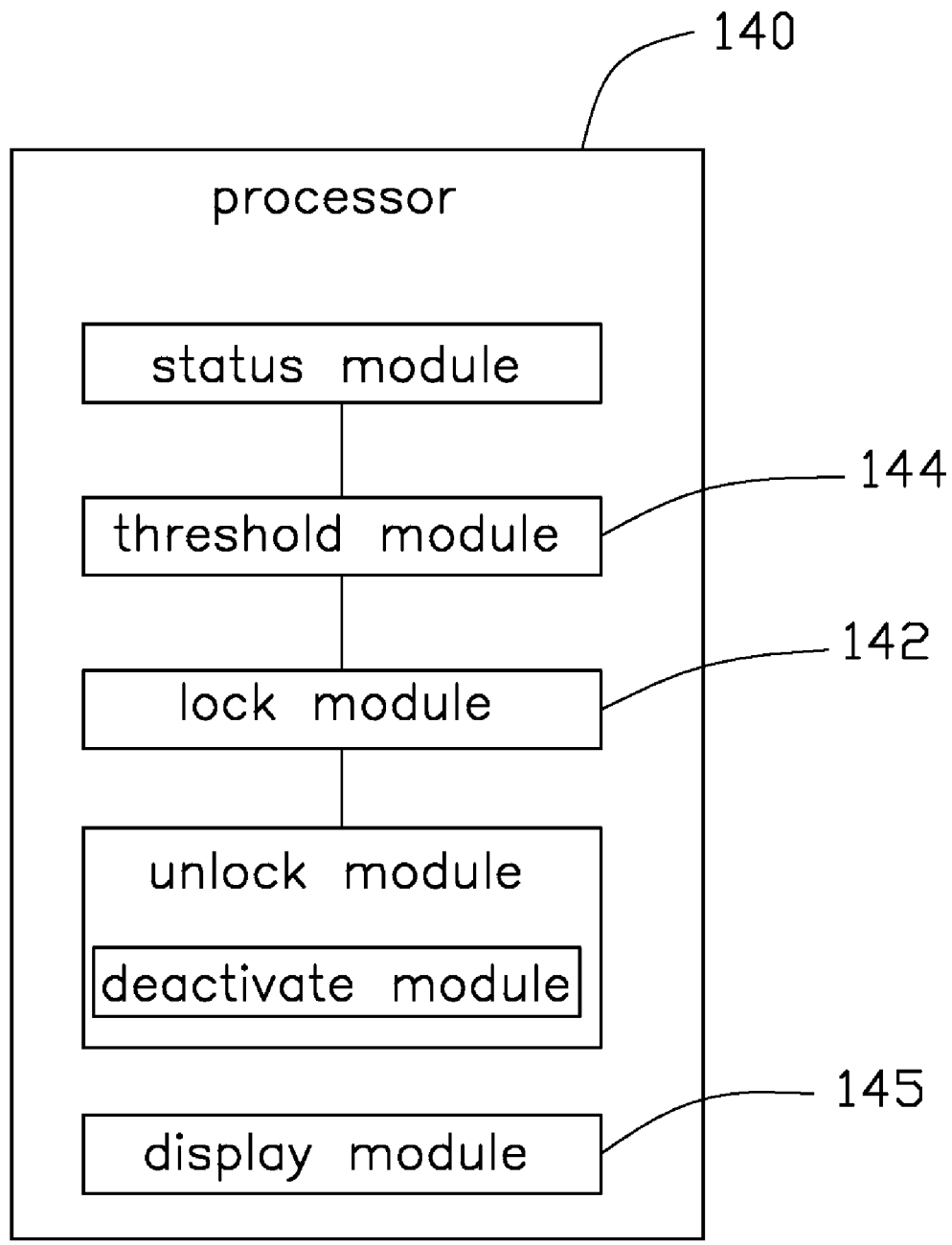
FIG. 5 is a functional block diagram of the security protection system of FIG. 4.

Referring to FIGS. 4 and 5, a security protection system 200, according to a second exemplary embodiment, is shown. The security protection system 200 of the second embodiment is similar to the security protection system 100 of the first embodiment except for the total number of the coils 110 and function of a processor 140 of the security protection system 200. In the present embodiment, the security protection system 200 includes a first coil 111, a second coil 112, a third coil 113, and a fourth coil 114.

The processor 140 of the security protection system 200 further includes a threshold module 144. The threshold module 144 stores a current threshold. And the threshold module 144 is electrically coupled to the lock module 142, and configured for detecting induced current from the coils 110. The coils 110 nearby a magnetic stylus 130 can induce different currents, only one of the coils 110 is able to provide an induced current greater than the threshold current with the magnetic stylus 130.

The parameters of the induced current further include the sequence of the induced current from the coils 110. In the present embodiment, the lock module 142 uses the sequence of the different induced currents from the coils 110 and the frequency of the change of the induced current's direction as a password saving in a memory 150.

For example, when the magnetic stylus 130 moves close to and away from the first coil 111 once, moved close to and away from the second coil 112 twice, moved close to and away from the third coil 113 once, moved close to and away from the fourth coil 114 one time, the lock module 142 captures the frequency of the change of the induced current's direction of each coil as a password to save in the memory 150.

When there are lots of coils, the precise location of each coil cannot be known. In the present embodiment, processor 140 further includes a display module 145. The display module 145 is configured for displaying the location of every coil on the display 7 and a password start position of magnetic stylus 130. In the present embodiment, the display module 145 defines the position of the first coil 111 at the upper left corner of the panel 70 as a start position of magnetic stylus 130. When inputting a password, the magnetic stylus 30 starts from the start position.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A security protection system for an electronic device, the security protection system comprising:
   a magnetic stylus;
   at least one coil received in the electronic device configured for inducing an induced current when the magnetic stylus moves relative to the at least one coil;
   a memory; and
   a processor electronically connected to the at least one coil, the processor comprising:
      a status module configured for setting the security protection system in a lock state or an unlock state in a preset time;
      a lock module electrically coupled to the status module, and configured for storing parameters of the induced current as a password into the memory in the lock state; and
      an unlock module electrically coupled to the status module, and configured for comparing inputted parameters of the induced current with the password stored in the memory, and detecting whether an unlock operation is successful;
   wherein the number of the at least one coil is one, the lock module further comprises a time module configured for capturing the time interval between the change in the direction of the induced current and time interval of occurrence of the induced current, and the parameters of the induced current comprise at least one of frequency of the change in the direction of the induced current and the time interval between the change and time interval of occurrence of the induced current.

2. The security protection system as claimed in claim 1, wherein the magnetic stylus is made of permanent magnetic material.

3. The security protection system as claimed in claim 1, wherein the security protection system comprises a plurality of coils, and the processor further comprises a threshold module electrically coupled to the lock module with a preset threshold current, the threshold module is configured for capturing different induced currents from the coils, and only one coil induced current greater than the threshold current is confirmed to be chosen by the magnetic stylus.

4. The security protection system as claimed in claim 1, wherein the shape of the at least one coil is selected from rectangular, circular and triangular.

5. The security protection system as claimed in claim 1, wherein the unlock module further comprises a deactivate module, the deactivate module stores a predetermined count, and if the number of wrong password has reached the predetermined count, the deactivate module will stop further unlock operations by the unlock module.

6. An electronic device comprising:
   at least one coil received in the electronic device configured for inducing an induced current when a magnetic stylus moves relative to the at least one coil;
   a memory; and
   a processor electrically connected to the at least one coil, comprising:
      a status module configured for setting a security protection system in a lock state or an unlock state in a preset time;
      a lock module electrically coupled to the status module, and configured for storing parameters of the induced current as a password into the memory in the lock state; and
      an unlock module electrically coupled to the status module, and configured for comparing parameters of the induced current with the password stored in the memory, and detecting whether an unlock operation is successful;
   wherein the number of coil is one, the lock module also comprises a time module configured for capturing the time interval between the change in the direction of the induced current and time interval of occurrence of the induced current, and the parameters of the induced current comprise at least one of frequency of the change in the direction of the induced current and the time interval between change and time interval of occurrence of the induced current.

7. An electronic device comprising:
at least one coil received in the electronic device configured for inducing an induced current when a magnetic stylus moves relative to the at least one coil;
a memory; and
a processor electrically connected to the at least one coil, comprising:
   a status module configured for setting a security protection system in a lock state or an unlock state in a preset time
   a lock module electrically coupled to the status module, and configured for storing parameters of the induced current as a password into the memory in the lock state; and
   an unlock module electrically coupled to the status module, and configured for comparing parameters of the induced current with the password stored in the memory, and detecting whether an unlock operation is successful;
wherein the electronic device comprises a display, and the electronic device comprises a circuit board and a panel fixed on the circuit board, and the at least one coil is fixed on the circuit board.

8. The electronic device as claimed in claim 7, wherein the processor further comprises a display module configured for displaying the location of the at least one coil on the display and a moving initial position of the magnetic stylus.

9. The electronic device as claimed in claim 7, wherein the at least one coil is printed on the circuit board.

10. The electronic device as claimed in claim 6, wherein the shape of the at least one coil is selected from a rectangular, circular and triangular.

11. The electronic device as claimed in claim 6, wherein the unlock module further comprises a deactivate module, the deactivate module stores a predetermined count, and if the number of wrong password has reached the predetermined count, the deactivate module will stop further unlock operations by the unlock module.

* * * * *